(12) United States Patent
Lakew

(10) Patent No.: US 11,992,017 B2
(45) Date of Patent: May 28, 2024

(54) INJERA BATTER INJECTOR ASSEMBLY AND EMBODIMENTS OF INJERA MAKERS

(71) Applicant: Mekonen Woldetansay Lakew, Calgary (CA)

(72) Inventor: Mekonen Woldetansay Lakew, Calgary (CA)

(73) Assignee: Mekonen Woldetansay Lakew, Calgary (CA)

( * ) Notice: Subject to any disclaimer, the term of this patent is extended or adjusted under 35 U.S.C. 154(b) by 772 days.

(21) Appl. No.: 16/817,434

(22) Filed: Mar. 12, 2020

(65) Prior Publication Data

US 2021/0282408 A1 Sep. 16, 2021

(51) Int. Cl.
*A21C 5/00* (2006.01)
*A21B 5/00* (2006.01)
*A47J 44/00* (2006.01)

(52) U.S. Cl.
CPC .............. *A21C 5/006* (2013.01); *A21B 5/00* (2013.01); *A47J 44/00* (2013.01)

(58) Field of Classification Search
CPC ............. A21C 5/006; A21B 5/00; A47J 44/00
See application file for complete search history.

(56) References Cited

U.S. PATENT DOCUMENTS 3,537,404 A * 11/1970 Rohrbacher .............. A21B 5/02
  118/325
5,441,173 A * 8/1995 Koval ....................... A21C 5/00
  222/63
10,092,011 B1 * 10/2018 Bekele ....................... A21C 9/08
2010/0075001 A1 * 3/2010 Succar ............... B65D 47/2018
  222/402.1
2018/0035676 A1 * 2/2018 Asfaw ....................... A21B 5/00
2018/0184670 A1 * 7/2018 Asfaw .................... A21B 7/005

OTHER PUBLICATIONS

Merriam-Webster, Actuator, 2022 (Year: 2022).*
Muhammad Asim Niazi, Introduction to Flow Control Valves, Aug. 26, 2021, Control Automation, <https://control.com/technical-articles/introduction-to-flow-control-valves/> (Year: 2021).*

* cited by examiner

*Primary Examiner* — Dana Ross
*Assistant Examiner* — Adam M Eckardt
(74) *Attorney, Agent, or Firm* — Gowling WLG (Canada) LLP

(57) ABSTRACT

A batter injector for dispensing a layer of batter rotatable about a pivot point includes a main body defining a batter reservoir, an input port defined by an opening the main body in communication with the batter reservoir to receive batter in to the batter reservoir, a plurality of openings on an injector end of the main body in communication with the batter reservoir, and one or more valves controlling the opening and closing of the openings. An injera maker includes a frame, a controller, a cooking module, a reservoir module and a batter injector module. The cooking module includes a heating element and a closeable lid. The reservoir module includes a main reservoir tank and a valve to selectively permit flow through a conduit. The batter injector module has a plurality of openings.

17 Claims, 10 Drawing Sheets

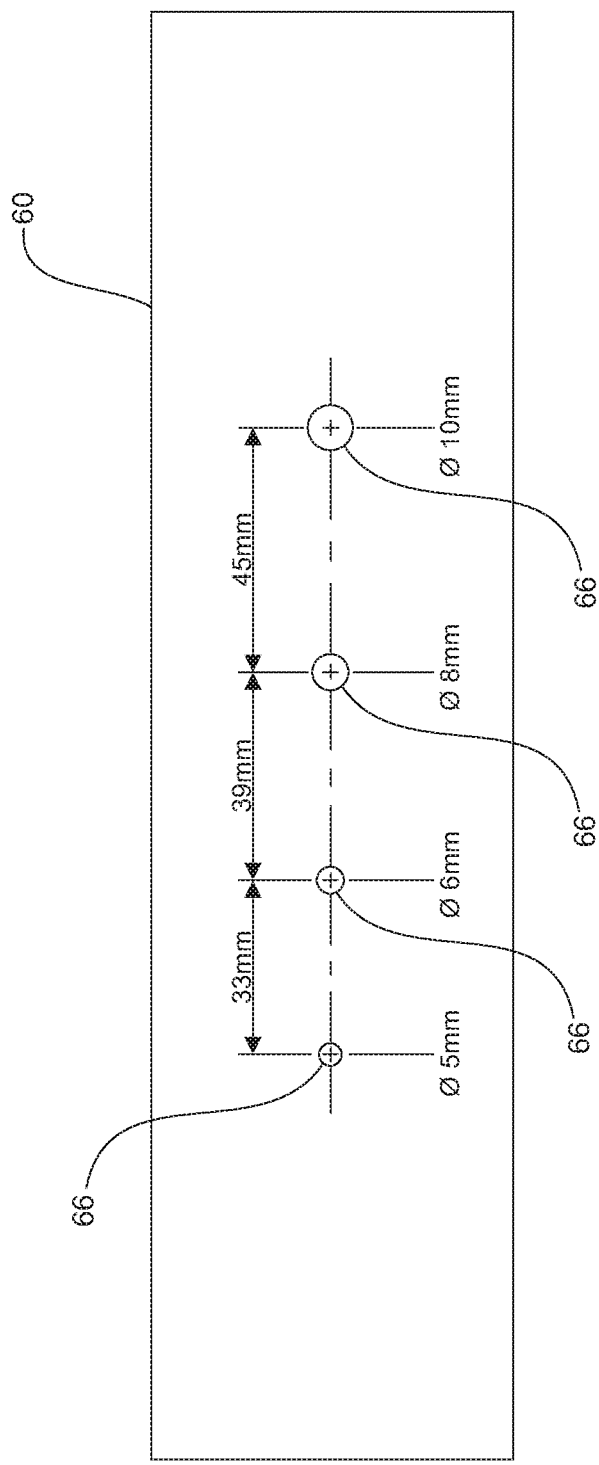

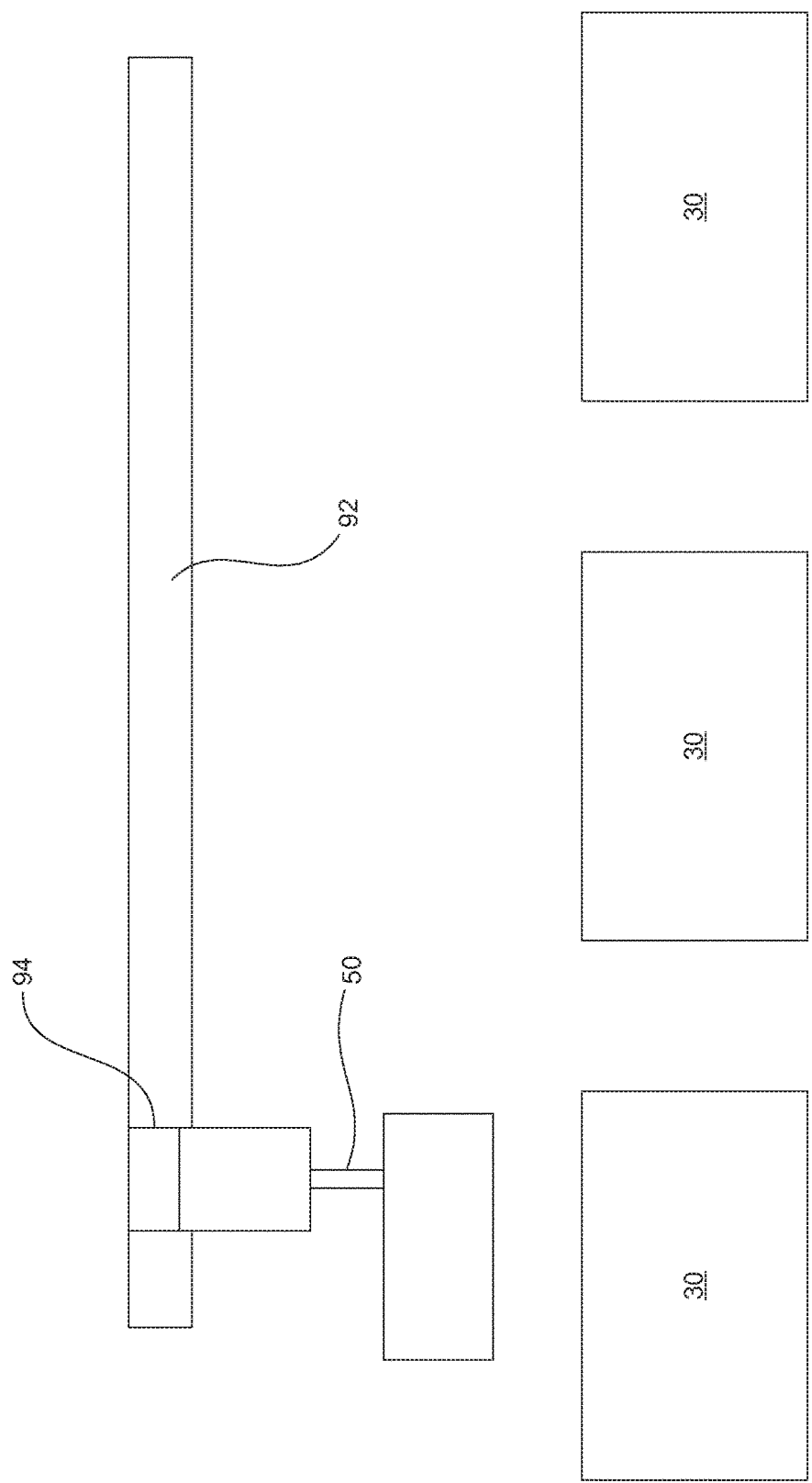

INJERA BATTER INJECTOR ASSEMBLY AND EMBODIMENTS OF INJERA MAKERS

FIELD

Embodiments herein relate to systems and apparatus for automatically producing injera bread. Specifically, embodiments herein relate to systems and apparatus with rotatable batter injector assemblies.

BACKGROUND

Injera or enjera bread is a spongy, risen flatbread traditionally made from teff, originating from Eritrea and Ethiopia where it is predominantly eaten as a staple food. The process of making injera involves pouring a thin layer of injera batter onto a pre-heated flat baking surface so as to thinly cover the cooking surface. Injera batter is traditionally manually poured on a heating element, rather than rolled out. The bottom surface of injera, which touches the heating element, generally has a smooth texture, while the top surface is more porous.

A characteristic of injera is that it has generally uniform thickness. Automated methods of making injera bread utilize air pressure or various batter depositing techniques to produce injera of uniform thickness. There remains a need for improved batter injector to produce injera bread of uniform thickness requiring less maintenance that does not require the use of pressurized air while providing fast delivery of batter.

SUMMARY

A rotatable batter injector is disclosed for making injera bread of generally uniform thickness. The batter deposited from the rotatable batter injector does not require physical contact nor air pressure to adjust thickness.

In one aspect, a batter injector for dispensing a layer of batter rotatable about a pivot point includes a main body defining a batter reservoir, an input port defined by an opening the main body in communication with the batter reservoir to receive batter in to the batter reservoir, a plurality of openings on an injector end of the main body in communication with the batter reservoir, and one or more valves controlling the opening and closing of the openings.

In another aspect, an injera maker includes a frame, a controller, a cooking module, a reservoir module and a batter injector module. The cooking module includes a heating element, a lid to cover the heating element and a lid actuator controlled by the controller and configured to move the lid between covering and non-covering positions. The reservoir module includes a main reservoir tank, a conduit extending from the main reservoir tank and a valve controlled by the controller to selectively permit flow through the conduit. The batter injector module is located above the cooking module and includes a plurality a plurality of openings formed in an injection end of the batter injector, one or more valves controlled by the controller to actuate the openings between open and closed positions, an arm attaching the batter injector module to the frame, and a rotation actuator controlled by the controller to rotate the injector about the arm.

BRIEF DESCRIPTION OF THE DRAWINGS

FIG. 6 is a schematic illustrating the injection of batter of an embodiment of a batter injector with non-uniform sized openings.

FIG. 8 is a schematic illustrating an embodiment of an injera maker machine with a linear array of cooking modules.

DETAILED DESCRIPTION

Injera or enjera bread is a spongy, risen flatbread originating from Eritrea and Ethiopia where it is predominantly eaten as a staple food and is traditionally made from an ancient grain, teff.

Injera bread is generally made from a batter mixture with a viscosity that is high enough to retain leavening gasses while cooking but also thin enough to allow a finished product that is generally three to six millimeters in thickness and between 16 to 20 inches in diameter. The spongy texture of the injera is preferably uniform throughout and the voids caused by leavening gases generally increase in size further away from the heating element. Injera is preferably soft and flexible and has a unique brownish colour.

Injera is traditionally cooked on a hot heating element having a generally round and flat shape. A cover may be placed over the heating element when cooking injera to assist in the shaping and cooking of the injera.

The process of making injera involves pouring a thin layer of injera batter onto a pre-heated flat baking surface so as to thinly cover the cooking surface. Injera batter is traditionally manually poured on a heating element, rather than rolled out. The bottom surface of injera, which touches the heating element, generally has a smooth texture, while the top surface is more porous. This porous texture of injera is desirable as it facilitates scooping up sauces and dishes. In contrast to the preparation of pancakes, in which the patty is flipped during cooking, injera sheets are baked on one side only during preparation. The thinly spread batter bakes to its characteristic thin, soft, porous appearance in about a minute.

Figure 1:
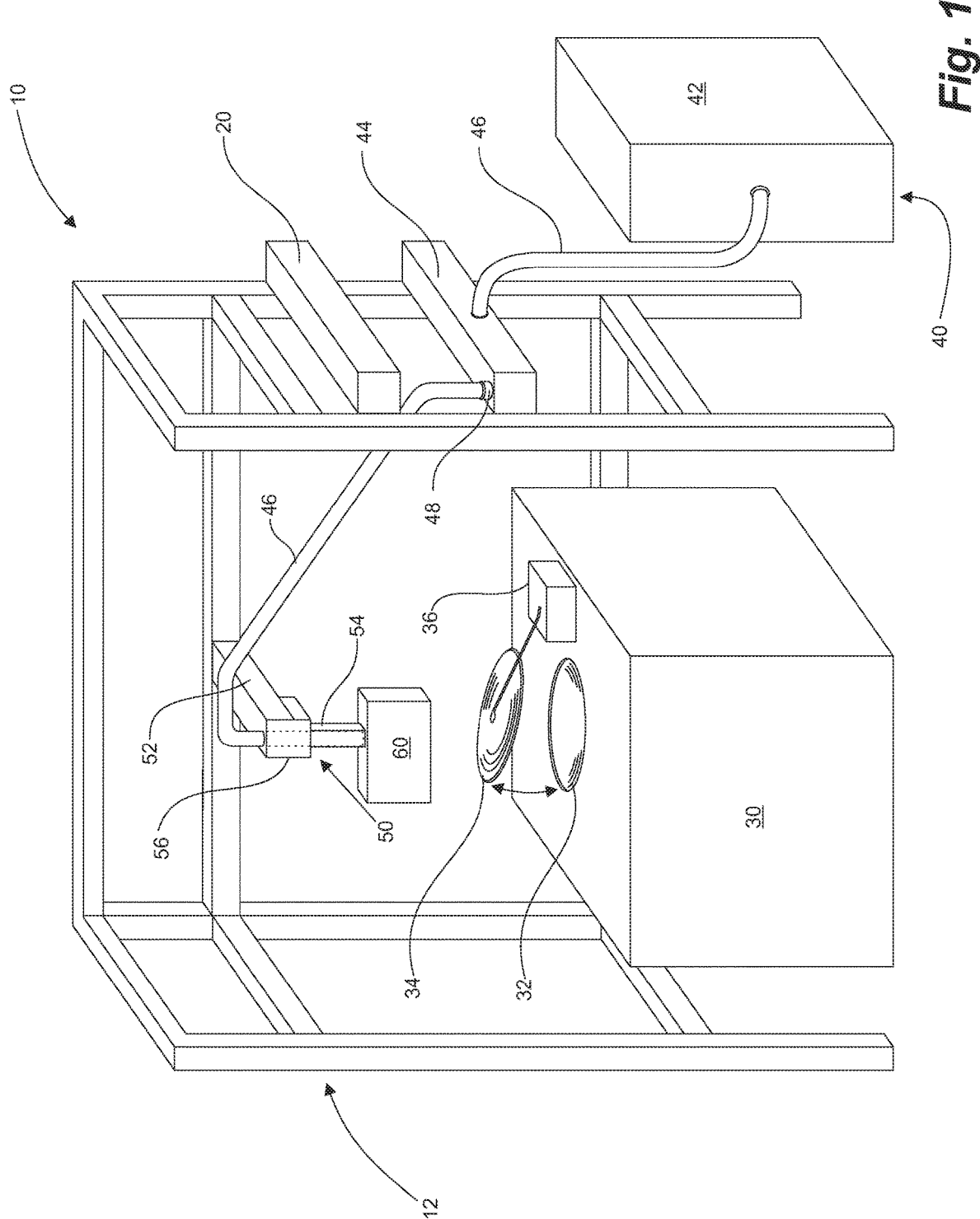
FIG. 1 is a schematic of an embodiment of an injera maker machine.
Figure 2:
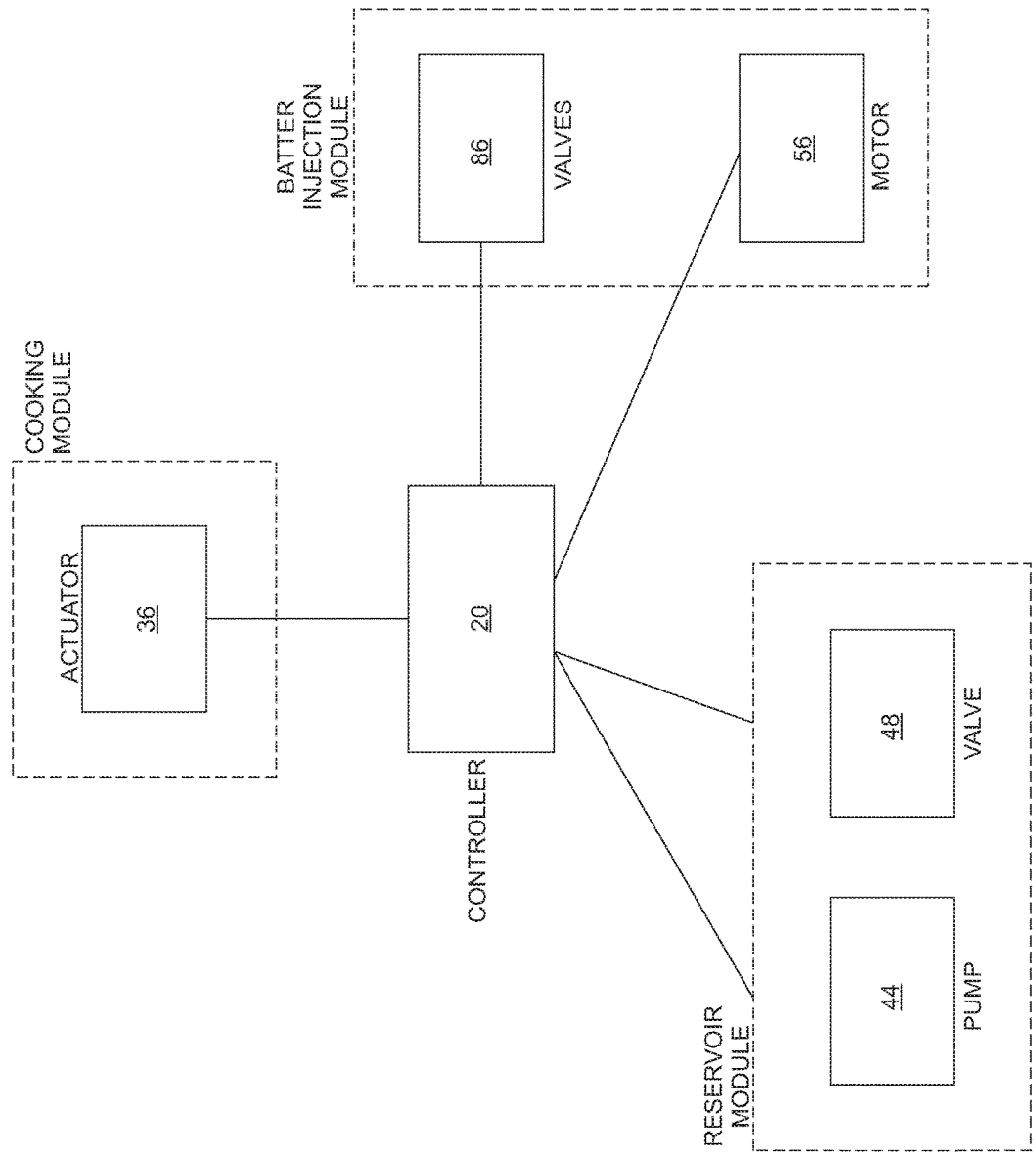
FIG. 2 is a diagram illustrating controller connections of the injera maker machine of FIG. 1.

Referring to FIGS. 1 and 2, an embodiment of an injera making machine 10 comprises a frame 12, a controller 20, a cooking module 30, a reservoir module 40 and a batter injector module 50. The cooking module 30 comprises a heating element 32, a lid 34 and an actuator 36 controlled by the controller 20. In embodiments, the heating element 32 comprises a non-stick coating such as Teflon™. The reservoir module 40 comprises a main reservoir tank 42 connected to the batter injector module 50 via a conduit 46, such as a hose or a tube, extending therebetween. A pump 44 or other means to extract batter from the main reservoir tank 42 can be connected to the conduit 46 for delivering batter from the main reservoir tank 42 to the injector module 50. The main reservoir tank may further comprise sensors to detect the level of batter therein. The reservoir module may also contain one or more valves 48 in different locations including at the end of the conduit distal from the pump 44, for selectively permitting the flow of injera batter from the main reservoir tank 42. The main reservoir tank 42 could also be arranged relative to location where batter is required in a manner utilizing gravitational forces and potentially obviating the need for the pump 44. In embodiments, the pump 44 and the valve 48 are controlled by the controller 20.

The batter injector module 50 comprises a primary arm 52 attached to the frame 10, a batter injector 60 and a secondary arm 54 proximate to the distal end of the primary arm 52 and rotationally attached to the batter injector 60. The primary arm 52 and the secondary arm 54 are arranged such that the batter injector 60 is located above the cooking module 30. In embodiments, the secondary arm 54 is rotationally driven by a motor 56. In embodiment, the motor 56 could be rotationally attached to the batter injector module 50 and the motor 56 such that the motor 56 can drive the batter injector module 50 to rotate relative to the secondary arm 54.

Batter Injector

Figure 3B:
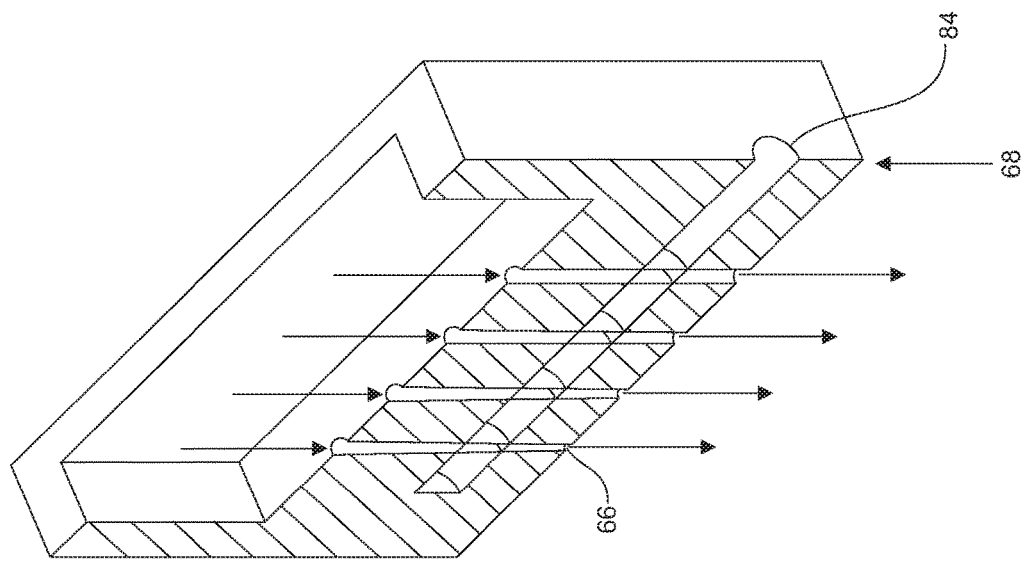
FIG. 3B is a section perspective view of the batter injector of FIG. 3A.
Figure 3A:
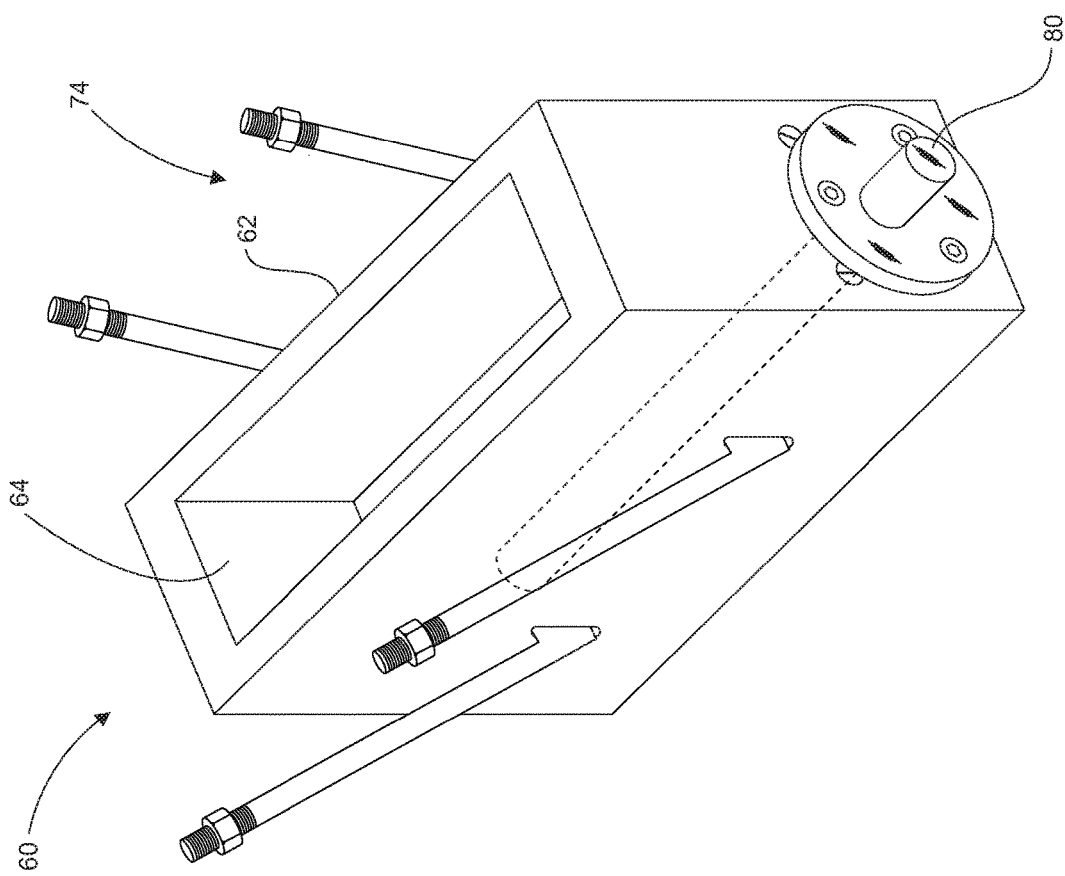
FIG. 3A is a perspective view of an embodiment of a batter injector.
Figure 5:
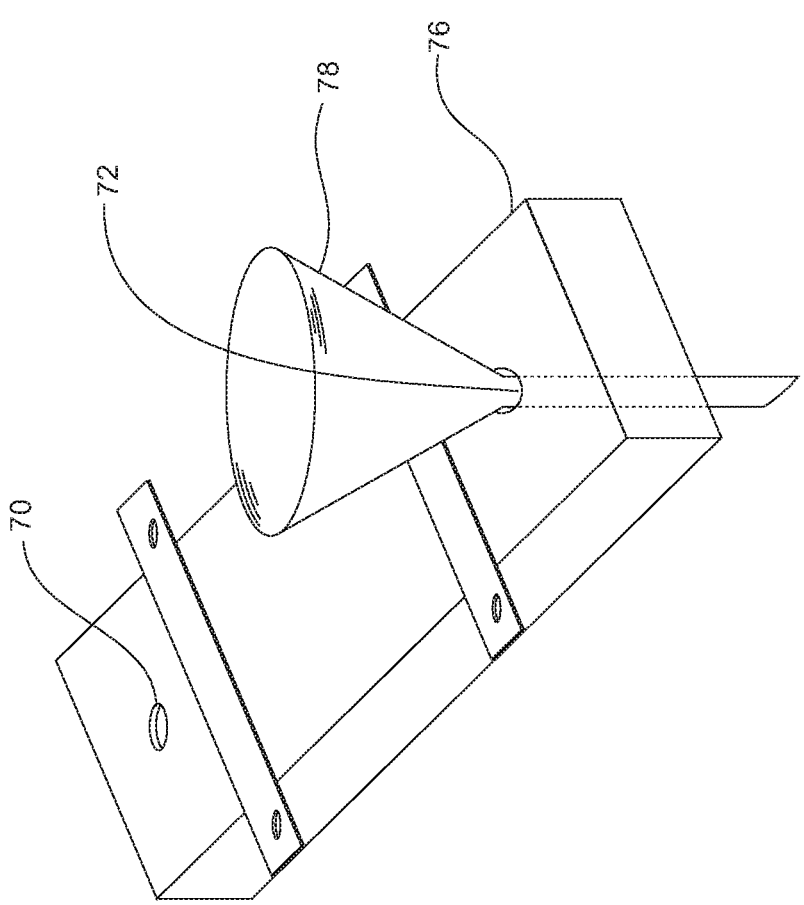
FIG. 5 is a perspective view of a lid of the batter injector of FIG. 3A.

Referring to FIGS. 3A and 3B, the batter injector 60 comprises a main body 62 defining a reservoir area 64. In embodiments, the main body 62 is comprised of moulded silicone but any material with adequate rigidity and which is suitable for food production could be used as well. The batter injector 60 further comprises a plurality of openings 66 on a first or injector end 68 in communication with the reservoir area 64. The first end 68 generally proximate the cooking module 30. Referring to FIG. 5, the batter injector 60 further comprises an input port 70 for receiving batter into the reservoir area 64. In embodiments, the batter injector 60 may also comprise an air release opening 72. The conduit 46 is inserted into the input port 70. In embodiments, the conduit 46 is contained within the primary arm 52 and the secondary arm 54. In embodiments, the air release opening 72 is located at a second end 74 of the reservoir opposite the first end 68. In embodiments, the air release opening 72 further comprises a dual-open ended structure 78, such as a tube or a funnel, extending from the second end 74 to allow air to pass into the reservoir area 64 therethrough and able to temporarily retain any batter overflowing from the reservoir 64. The dual-ended structure 78 in operation also permits the operator to visually inspect batter.

In embodiments, the second end 74 of the batter injector 60 is an open end. Referring to FIG. 5, in embodiments, the batter injector 60 further comprises a removable lid 76. The removable lid 76 may comprise the input port 70 and the air release opening 72. The removable lid 76 may be removably coupled to the batter injector 60. For example, the removable lid 76 may be attached to the batter injector 60 with fasteners such screws, pins or bolts. In embodiments, the batter injector comprises a plurality of bolts attached to the exterior side walls to attach to the removable lid 76. The removable lid 76 can have the input port 70 and air release opening 72 formed therein. In embodiments, the conduit 46 is inserted into the input port 70 and sealed thereon.

Figure 4:
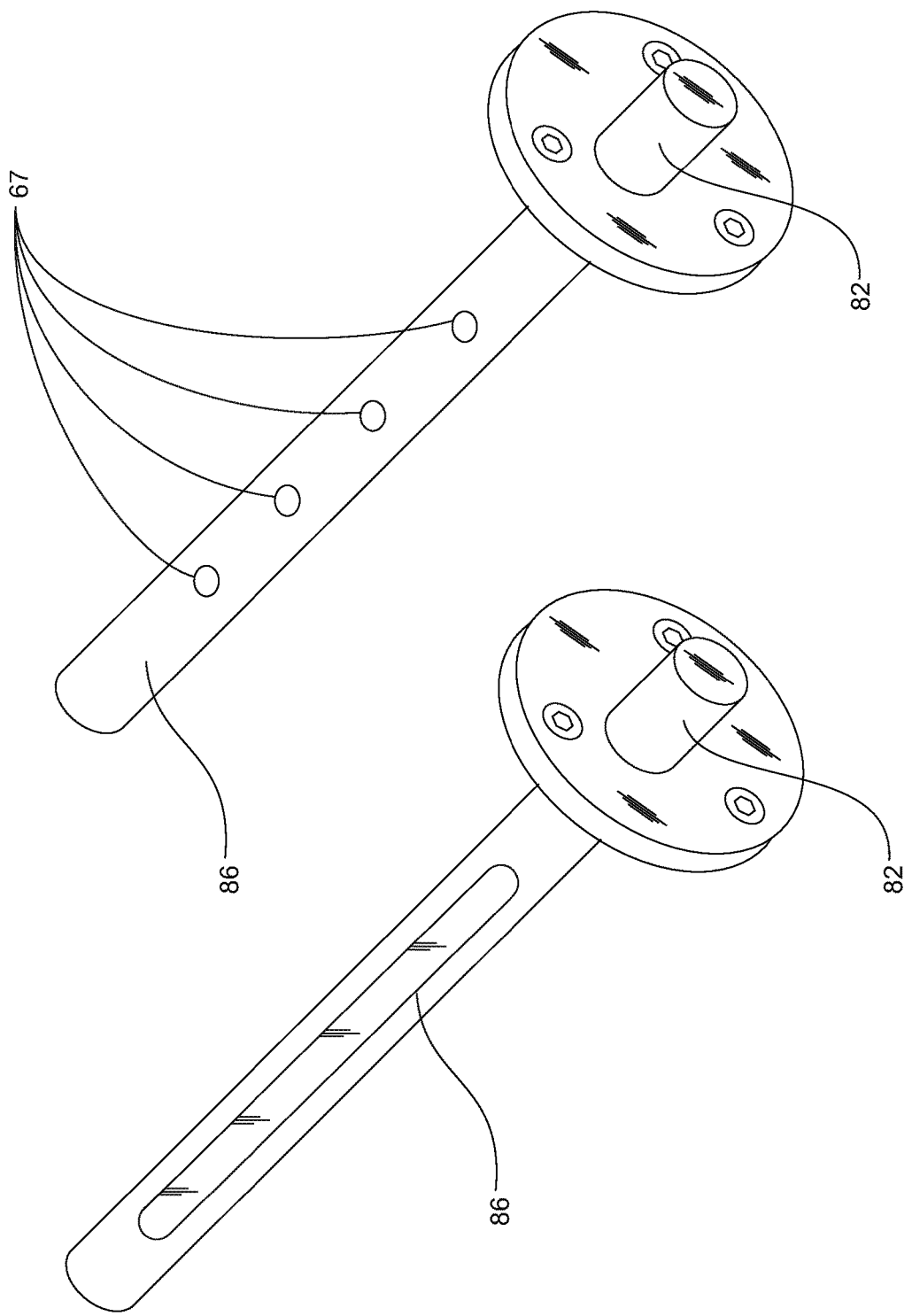
FIG. 4 are perspective views of embodiments of a valve of the batter injector of FIG. 3A.

In embodiments, the openings 66 are opened and closed by one or more valves 80. Referring to FIG. 4, in embodiments, the valve 80 is a single rod 82 inserted through a bore 84 of the batter injector 60 intersecting the openings 66. In embodiments, the rod 82 comprises a slot opening 86 extending radially through the rod 82 and along an axial length thereof. In embodiments, the rod 82 comprises a plurality of bores 67 with sizes and locations corresponding to the plurality of openings 66. The rod 82 may be rotated in the bore 84 to allow the valves to actuate from an "open" position allowing free flow of batter through the openings 66 and a "closed" position stopping the flow of batter through the openings 66. In embodiments, rotation of the rod 82 is controlled by an actuator 88 controlled by the controller 20.

Figure 7A:
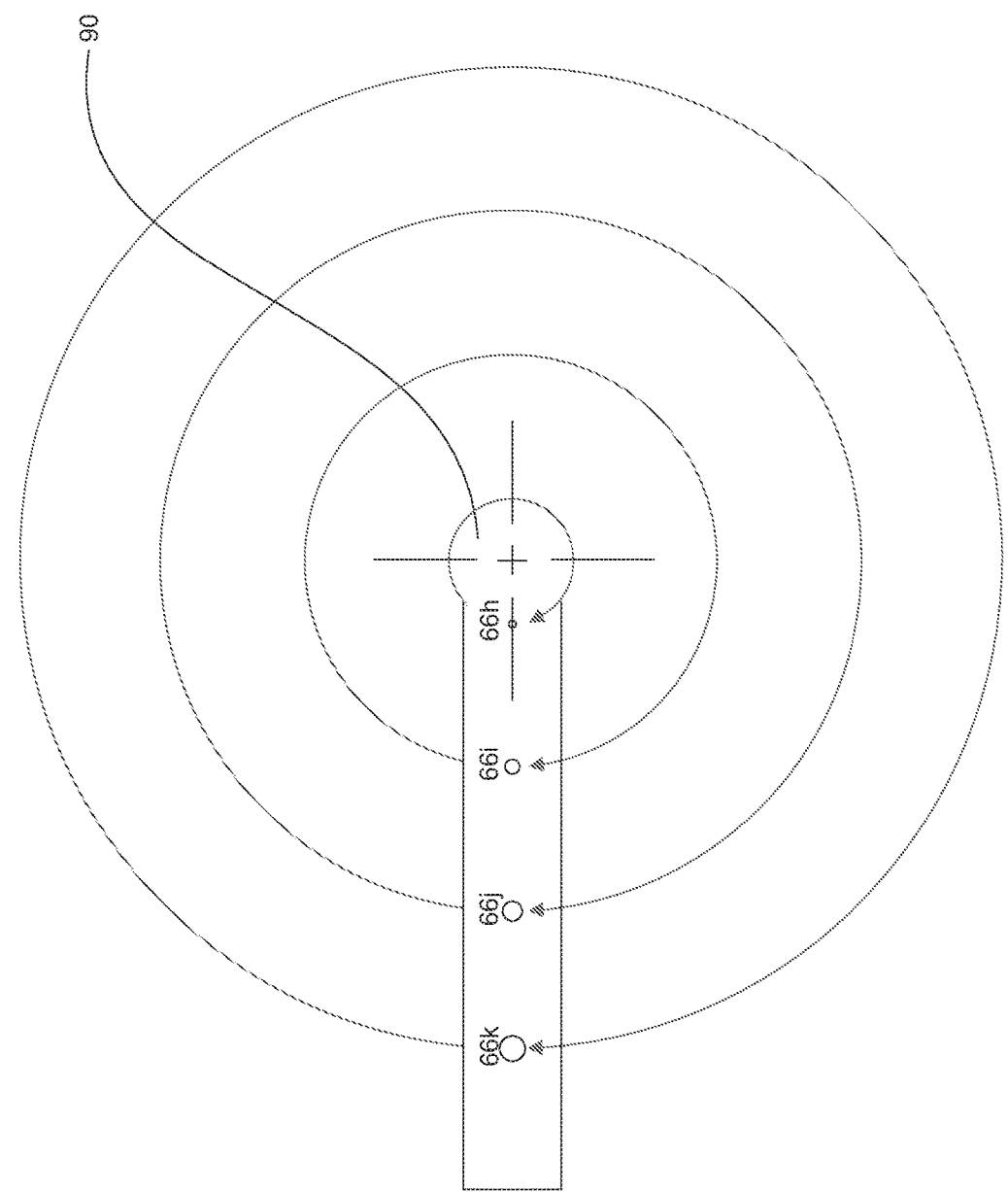
FIG. 7A is a schematic illustrating the injection of batter of an embodiment of a batter injector with non-uniformly sized openings.
Figure 7B:
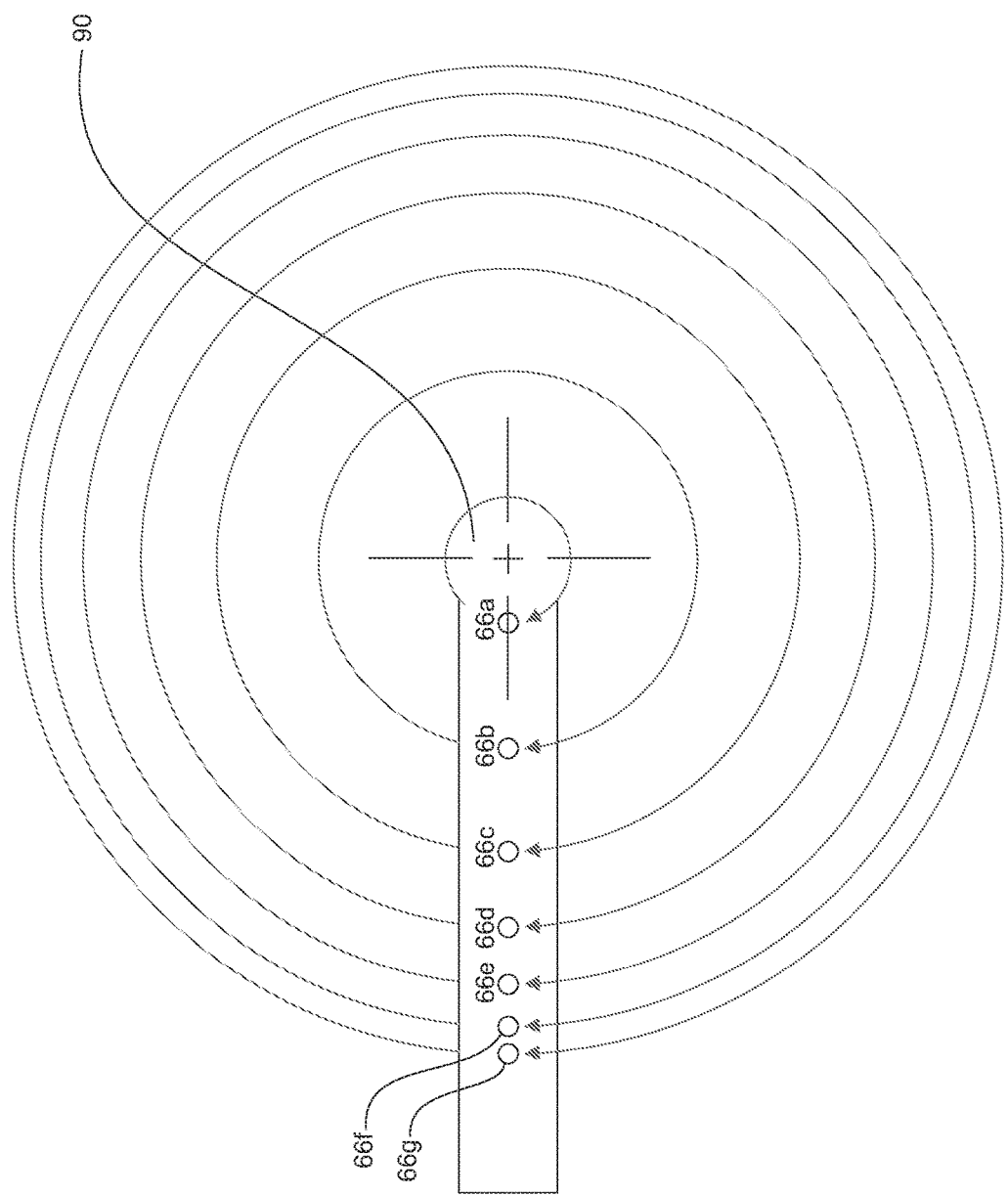
FIG. 7B is a schematic illustrating the injection of batter of an embodiment of a batter injector with non-uniformly spaced openings.

The arrangement and configurations of the openings 66 can be varied based on the position at which the secondary arm 54 is connected to the batter injector 60. For example, referring to FIG. 1, the secondary arm 54 is located at position 90 and therefore the batter injector 60 rotates about position 90. The openings 66 of the batter injector 60 proximal to position 90 travel less distance than openings 66 distal from position 90 as the batter injector 60 is rotated thereabout. As an injera of uniform thickness is desirable, the openings 66 that travel a greater distance require more batter. In embodiments, the openings 66 located distally from position 90 can either be made larger or spaced closer together or both. Referring to FIG. 7B, in an embodiment, the openings 66 are of uniform size but the spacing increases as the openings 66 are distal from 90. Referring to FIG. 7A, in an embodiment, the spacing of the openings 66 are uniform throughout but the size of the openings 66 increase as they become distal from 90. A combination of different sizes and different spacing of the openings 66 may also be used. The spacing and sizing of the openings 66 may also take into account the viscosity of the particular batter used, the temperature of the heating element 32 and the thermal conductivity and capacity of the heating element 32 among other factors. Referring to FIG. 6, in an embodiment, the batter injector 60 comprises four (4) openings 66 with different sizes and different spacing, the diameters of the openings 66 being 5 mm, 6 mm, 8 mm and 10 mm and the spacing between the openings 66 being 33 mm, 39 mm and 45 mm.

Operation

In operation, the main reservoir tank 42 is filled with an appropriate amount of batter and the heating element 32 is heated to a suitable temperature, for example, approximately 180 to 200 degrees Celsius. An appropriate amount of batter is then either pumped or otherwise delivered from the main reservoir tank 42 through the conduit 46 to the batter injector 60. The valves 80 are then opened as the batter injector 60 is rotated delivering a generally uniform layer of batter onto the heating element 32. The batter is placed on the heating element 32 for approximately twenty seconds prior to the lid 34 being close. The lid 34 is closed for approximately ninety seconds after which the injera can be removed from the heating element. Heating times can be adjusted according to conditions such as batter composition, amount, etc.

The batter injector 60 allows for quick rotation and faster delivery of batter to heating elements 32 requiring only a fraction of the approximately two minutes of cooking time per injera. To take full advantage of the batter injector 60 design given that cooking time is a multiple of batter injection time, embodiments of the injera maker 10 can comprise multiple cooking modules 30 for each batter injection module 50.

Referring to FIG. 8, in an embodiment, the injera maker 10 comprises three (3) cooking modules 30 arranged in a linear array and one (1) batter injector module 50. The frame 12 further comprises a rail 92 parallel to the line of cooking modules 30. The batter injector module 50 is slidably attached to the rail 92 and its position on the rail 92 is controlled by an actuator 94. The actuator 94 is controlled by the controller 20. Batter is injected on the cooking modules 30 one-by-one with a process similar to the above for a one cooking module 30 configuration, the actuator 94 moving the injector 60 to each cooking module 30 and the actuator 36 rotating the injector 60 to distribute the batter on the cooking modules 30.

The embodiment of the injera maker 10 illustrated in FIG. 8 has three cooking modules 30 but the injera maker 10 can have any appropriate number of cooking modules 30. The ratio of cooking modules to batter injectors could be adjusted to meet performance requirements, including the use of multiple batter injectors 60.

In embodiments, the injera maker 10 can be configured and comprise the necessary components such that the batter injector module 50 is attached in a fixed position and the cooking modules 30 are capable of being moved relative to the batter injector module 50.

Figure 9:
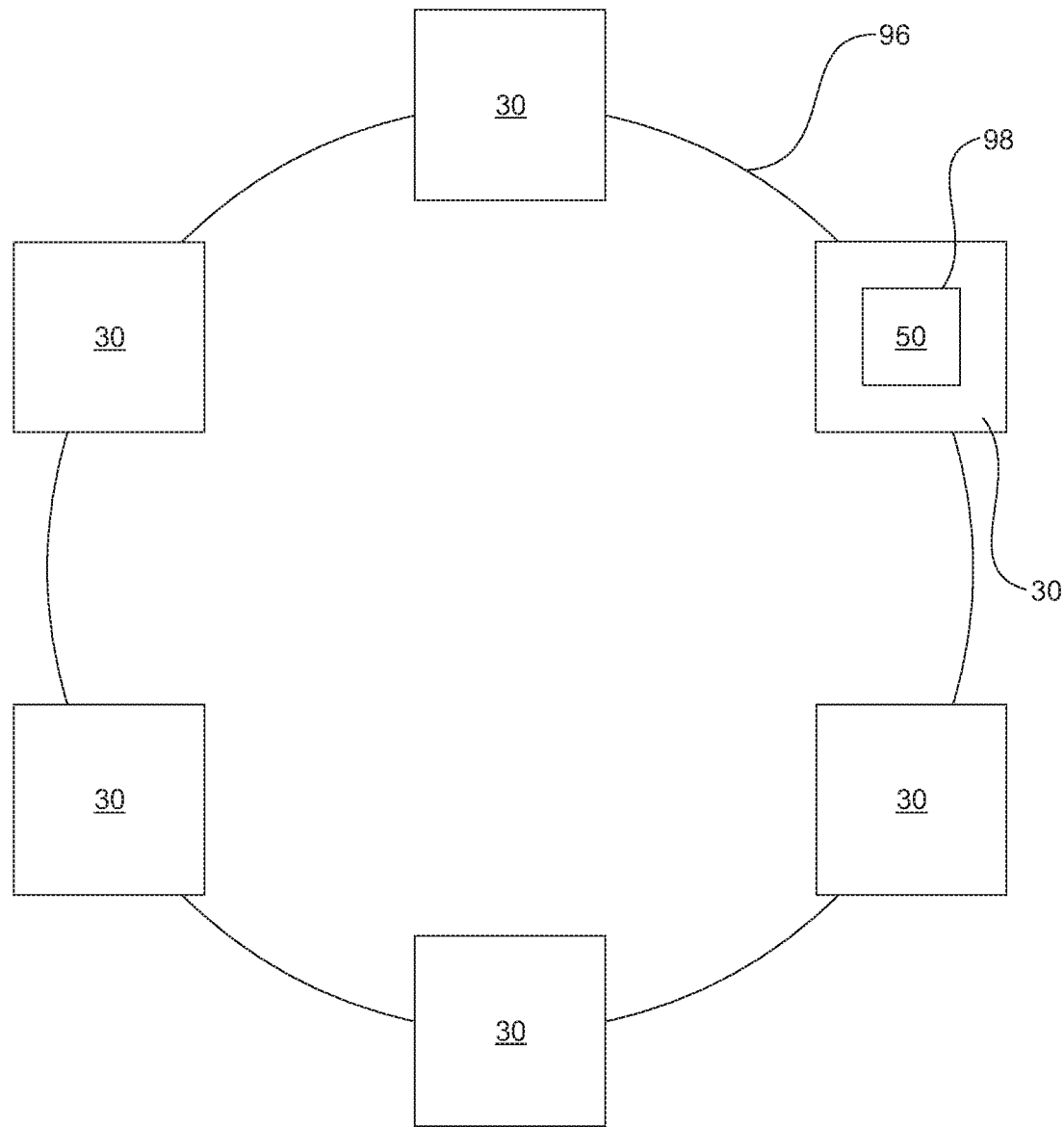
FIG. 9 is a schematic illustrating an embodiment of an injera maker machine with a circular array of cooking modules.

Referring to FIG. 9, in an embodiment, the injera maker 10 comprises six (6) cooking modules 30 arranged in a circular array and one (1) batter injector module 50. The frame 12 further comprises a circular member 96 on which the cooking modules 30 are attached. The batter injector module 50 is attached on the frame 12 in a location above the circular member 96. The circular member 96 is rotatable and controlled an actuator 98. The actuator 98 is controlled by the controller 20. Batter is injected on the cooking modules 30 one-by-one with a process similar to the above for a one cooking module 30 configuration.

The embodiment of the injera maker 10 illustrated in FIG. 9 has six cooking modules 30 but the injera maker 10 can have any appropriate number of cooking modules 30. The ratio of cooking modules to batter injectors could be adjusted to meet performance requirements, including the use of multiple batter injectors 60. The ratio of cooking modules 30 to batter injectors 60 could be adjusted to meet performance requirements, including the use of multiple batter injectors.

In embodiments, the injera maker 10 can be configured and comprise the necessary components such that the cooking modules 30 are attached in a fixed position on the frame 12 and the batter injector module 50 is attached to a rail with an actuator or other means such that the batter injector module 50 is capable of being moved to deliver batter to each cooking module 30.

Although a few embodiments have been shown and described, it will be appreciated by those skilled in the art that various changes and modifications can be made to those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof.

The embodiments in which an exclusive property or privilege is claimed are defined as follows:

1. A batter injector for dispensing a layer of batter rotatable about a pivot point comprising:
   a main body defining:
      a batter reservoir and an open end in communication with the batter reservoir to receive batter into the batter reservoir, and
      a bore proximate an injector end of the main body;
   a plurality of openings on the injector end in communication with the batter reservoir, the plurality of openings intersecting with the bore;
   a rod comprising a plurality of rod bores formed therethrough with sizes and in locations corresponding to the plurality of openings, the rod configured to fit into the bore wherein the rod is rotatable between at least:
      an open position, wherein the rod bores are aligned with the plurality of openings, and
      a closed position, wherein the rod bores are not aligned with the plurality of openings; and
   an actuator for rotating the rod at least between the open position and the closed position,
      wherein the injector end is distal the open end, and
      wherein the plurality of openings increase in size from a first end to a second end, the first end proximate the pivot point.

2. The batter injector of claim 1, wherein the plurality of openings are linearly arranged and round.

3. The batter injector of claim 1, wherein the plurality of openings are non-uniformly spaced wherein a distance between each of the plurality of openings decreases from the first end to the second end.

4. The batter injector of claim 1, wherein the plurality of openings are non-uniformly spaced wherein a distance between each of the plurality of openings increases from the first end to the second end.

5. The batter injector of claim 2,
   wherein the plurality of openings comprises a first opening, a second opening, a third opening, and a fourth opening,
   wherein a second diameter of the second opening is about 1.2 times a first diameter of the first opening,
   wherein a third diameter of the third opening is about 1.6 times the first diameter, and
   wherein a fourth diameter of the fourth opening is about 2 times the first diameter.

6. The batter injector of claim 5,
   wherein a second distance from a center point of the second opening to a center point of the third opening is about 1.18 times a first distance from the center point of the second opening to a center point of the first opening, and
   wherein a third distance from a center point of the fourth opening to the center point of the third opening is about 1.36 times the first distance.

7. The batter injector reservoir of claim 1 further comprising a lid removably coupled to the main body to cover the open end and comprising an input port in communication with the batter reservoir to receive batter into the batter reservoir.

8. The batter injector reservoir of claim 7, wherein the lid is removably coupled to the main body with fasteners.

9. The batter injector reservoir of claim 7 further comprising a vent port defined by an aperture in the lid in communication with the batter reservoir.

10. The batter injector reservoir of claim 9, wherein the lid further comprises a dual-open ended structure extending from the vent port to permit air to pass through and temporarily contain excess batter from the batter reservoir.

11. An injera maker comprising:
   a frame;
   a controller;
   a cooking module comprising:
      a heating element,
      a lid to cover the heating element, and a lid actuator controlled by the controller and configured to move the lid between covering and non-covering positions;
a reservoir module comprising:
a main reservoir tank,
a conduit extending from the main reservoir tank, and
a valve controlled by the controller to selectively permit flow through the conduit;
a batter injector module located above the cooking module comprising the rotatable batter injector of claim 1.

12. The injera maker of claim 11, wherein the reservoir module further comprises a pump controlled by the controller to extract batter from the main reservoir tank.

13. The injera maker of claim 12 further comprising:
a track attached to the frame;
a plurality of cooking modules arranged in an array aligned with the track;
the arm slidably connected to the track; and
an actuator to move the batter injector module along the track.

14. The injera maker of claim 13 further comprising a plurality of batter injector modules such that batter may be dispensed on more than one cooking module simultaneously.

15. The injera maker of claim 13, wherein the track is linear.

16. The injera maker of claim 11 further comprising:
a rotatable circular element attached to the frame;
a plurality of cooking modules arranged in a circular array on the rotatable circular element; and
an actuator to rotate the rotatable circular element.

17. The injera maker of claim 15 further comprising a plurality of batter injector modules such that batter may be dispensed on more than one heating station simultaneously.

* * * * *